(12) United States Patent
Ichinose et al.

(10) Patent No.: US 7,597,378 B2
(45) Date of Patent: Oct. 6, 2009

(54) TRUNK LID FRAME STRUCTURE

(75) Inventors: Tomofumi Ichinose, Shioya-gun (JP); Shintaro Ichimura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/177,316

(22) Filed: Jul. 22, 2008

(65) Prior Publication Data
US 2009/0026793 A1    Jan. 29, 2009

(30) Foreign Application Priority Data
Jul. 27, 2007   (JP) .................... 2007-196022

(51) Int. Cl.
    *B62D 25/10*    (2006.01)
(52) U.S. Cl. ..................................... 296/76
(58) Field of Classification Search ................ 296/76, 296/191; 180/69.2, 69.21
    See application file for complete search history.

(56) References Cited

U.S. PATENT DOCUMENTS

| | | | | |
|---|---|---|---|---|
| 2,709,108 | A | | 5/1955 | Eggert, Jr. |
| 3,938,610 | A | * | 2/1976 | Harman ................... 180/69.21 |
| 4,186,476 | A | * | 2/1980 | Mair et al. ................. 29/407.1 |
| 5,000,997 | A | * | 3/1991 | Ritchie et al. ................. 428/78 |
| 5,115,878 | A | * | 5/1992 | Hayata .................... 180/69.21 |
| 5,197,560 | A | * | 3/1993 | Oda et al. ................. 180/69.21 |
| 5,605,371 | A | | 2/1997 | Borchelt et al. |
| 5,806,619 | A | * | 9/1998 | Kleinhoffer et al. ........ 180/69.2 |
| 6,179,364 | B1 | * | 1/2001 | Takahashi ..................... 296/76 |
| 6,371,231 | B1 | * | 4/2002 | Nushii et al. ............. 180/69.21 |
| 6,398,286 | B1 | | 6/2002 | Devin et al. |
| 6,846,038 | B1 | * | 1/2005 | White et al. ........... 296/193.11 |
| 6,883,627 | B1 | * | 4/2005 | Staines et al. .............. 180/69.2 |
| 7,143,514 | B2 | * | 12/2006 | Kamada et al. ............ 29/897.2 |
| 7,228,929 | B2 | * | 6/2007 | Yiu .......................... 180/69.21 |
| 7,354,101 | B2 | * | 4/2008 | Donabedian et al. ... 296/193.11 |

FOREIGN PATENT DOCUMENTS

| | | |
|---|---|---|
| EP | 1083115 | 3/2001 |
| JP | 63-82681 | 5/1988 |
| JP | 06-016177 | 1/1994 |
| JP | 6-16177 | 3/1994 |
| JP | 06064560 | 3/1994 |
| JP | 2007308060 | 11/2007 |

* cited by examiner

*Primary Examiner*—Hilary Gutman
(74) *Attorney, Agent, or Firm*—Rankin, Hill & Clark LLP

(57) ABSTRACT

In the present frame structure of a trunk lid: the trunk lid has an outer panel and an inner panel, and is formed such that its cross-section is approximately L-shaped, with a top face part and a rear face part; left and right hinge installation sections are provided, and a lock installation section is provided in the left to right center of the rear face part; left and right beading parts are provided on the inner panel; and fastening parts of hinge arms are arranged diagonally along the lengthwise direction of the left and right beading parts.

5 Claims, 5 Drawing Sheets

TRUNK LID FRAME STRUCTURE

BACKGROUND OF THE INVENTION

Priority is claimed on Japanese Patent Application No. 2007-196022, filed Jul. 27, 2007, the contents of which are incorporated herein by reference.

1. Field of the Invention

The present invention relates to the frame structure of a trunk lid that is provided in a vehicle.

2. Description of the Related Art

Heretofore, in the above-mentioned trunk lid structure, there is one in which a trunk lid includes an outer panel and an inner panel, and is formed such that its cross-section is approximately L-shaped, with a top face part and a rear face part, wherein left and right hinge installation sections are provided on the left and right sides of the top face part, a lock installation section is provided in the left to right center of the rear face part, and left and right beading parts, which are in an approximately V-shaped arrangement such that they extend between the left and right hinge installation sections and the lock installation section, are provided on the inner panel (for example, refer to Japanese Unexamined Patent Application, First Publication No. H06-16177). In this manner, by linking the left and right hinge installation sections and the lock installation section via the left and right beading parts, it is possible to ensure the stiffness of the trunk lid efficiently.

Incidentally, in the above-described conventional technique, hinge installation bearing surfaces of the left and right hinge installation sections are formed in the vicinities of the end parts of the left and right beading parts. However, flexing is likely to occur between hinge arms, which are attached to the hinge installation bearing surfaces, and the left and right beading parts. Therefore, improvement is required in order to increase the stiffness of the whole trunk lid.

The present invention was made in view of the above circumstances, and has an object of limiting the flexing of the left and right hinge installation sections in the frame structure of a trunk lid installed in a vehicle, to improve the stiffness of the whole trunk lid.

SUMMARY OF THE INVENTION

In order to solve the above problems and to achieve the associated object, the present invention adopts the followings.

The present invention is a frame structure of a trunk lid installed in a vehicle, wherein: the trunk lid has an outer panel on an outside of the vehicle and an inner panel on an inside of the vehicle, and is formed such that its cross-section is approximately L-shaped, with a top face part and a rear face part; left and right hinge installation sections to which hinge arms of left and right trunk hinges are attached are provided respectively on the left and right sides of the top face part, and a lock installation section to which a trunk lock mechanism is attached is provided in the left to right center of the rear face part; left and right beading parts, which are in an approximately V-shaped arrangement such that they extend between the left and right hinge installation sections and the lock installation section, are provided on the inner panel; and fastening parts of hinge arms, which are fastened to the left and right hinge installation sections, are arranged diagonally along the lengthwise direction of the left and right beading parts.

According to the above-described trunk lid frame structure, since the fastening parts of the hinge arms of the left and right trunk hinges are arranged diagonally along the lengthwise direction of the left and right beading parts, the left and right beading parts are linked to the fastening parts of the hinge arms in straight lines, so that it is possible to limit the flexing of the left and right hinge installation sections efficiently, and thereby improve the stiffness of the whole trunk lid.

Furthermore, it is possible to provide the hinge installation bearing surfaces of the left and right hinge installation sections directly on the left and right beading parts, so that compared with the case in which the hinge installation bearing surfaces are formed separately in the vicinities of the left and right beading parts, it is possible to improve the formability of the inner panel and improve the stiffness as a result of increasing the beading depth and the like, and also improve the workability and lightening as a result of enlarging the working holes (lightening holes).

A construction may be employed in which: a hinge side beading part that extends between the left and right hinge installation sections is provided on the inner panel; and the hinge side beading part and the left and right beading parts are arranged continuously.

In this case, since the hinge side beading part that links the left and right hinge installation sections, and the left and right beading parts are continuous, the left and right hinge installation sections and the lock installation section, which are force input points to the trunk lid, are linked via the beading parts, and thus it is possible to increase the stiffness of the whole inner panel efficiently.

A construction may be employed in which: left and right stiffening members are provided in the left and right hinge installation sections respectively; and the left and right stiffening members are provided spanning the left and right beading parts and the hinge side beading part.

In this case, since the stiffening members of the left and right hinge installation sections are provided spanning the left and right beading parts and the hinge side beading part, it is possible to increase the stiffness with respect to the load at the joining sections of the left and right beading parts and the hinge side beading part when opening and closing the trunk lid.

A construction may be employed in which the left and right stiffening members extend diagonally along the lengthwise direction of the left and right beading parts, and also have wall parts that span the hinge side beading part.

In this case, since the left and right stiffening members have wall parts that span the hinge side beading part along their lengthwise direction, that is, the lengthwise direction of the left and right beading parts, it is possible to increase the stiffness with respect to the load at the joining sections of the left and right beading parts and the hinge side beading part when opening and closing the trunk lid.

A construction may be employed in which ends of fastening parts of the hinge arms are cut along a widthwise direction of the vehicle.

In this case, it is possible to effectively prevent the occurrence of stress concentration originating from the corners at the ends of the fastening parts of the hinge arms.

DETAILED DESCRIPTION OF THE INVENTION

Figure 1:
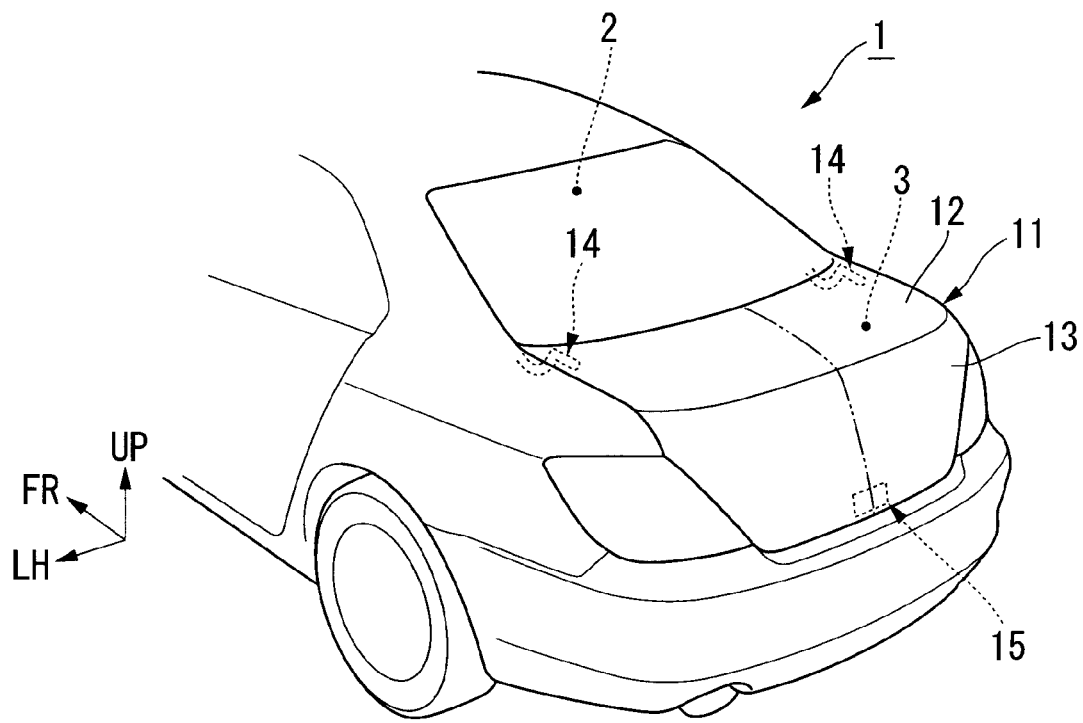
FIG. 1 is a perspective view of the rear part of a vehicle according to an embodiment of the present invention.

Hereunder, an embodiment of the present invention will be described with reference to the drawings. Here, the directions such as front and rear, right and left, are the same as those directions of the vehicle unless specified otherwise. Furthermore, arrows FR, arrows LH, and arrows UP in the drawings designate forward of the vehicle, leftward of the vehicle, and upward of the vehicle, respectively.

As shown in FIG. 1, in the rear part of a three-box type vehicle 1, a trunk lid 11 is provided on a trunk compartment 3, which is located in the rear of a compartment 2, to open and close its opening. The trunk lid 11 has a top face part 12 that covers the trunk compartment 3 from above, and a rear face part 13 that covers the trunk compartment 3 from the rear, formed as one piece, and is constructed such that the shape of its cross-section perpendicular to the widthwise direction (horizontal direction) of the vehicle is approximately L-shaped. Each structure associated with the trunk lid 11 of the present embodiment is left/right symmetrical with respect to the left to right center of the vehicle body unless specified otherwise.

The trunk lid 11 is supported on the vehicle body at the two sides of the front end part of the top face part 12 via a pair of left and right trunk hinges 14 such that it can turn thereabout. The trunk lid 11, in its totally closed state, is positioned in a state in which the top face part 12 is tilted beyond the horizontal plane such that it is slightly lower toward the rear, and the rear face part 13 is tilted such that its lower end part is located rearward of the vertical plane. By the trunk lid 11 being turned such that the rear face part 13 is moved upward from this state, the opening of the trunk compartment 3 is opened upward and rearward.

When the trunk lid 11 is turned such that the rear face part 13 is moved downward from a state in which the trunk compartment 3 is opened as described previously, and reaches the above-described totally closed state in which the opening of the trunk compartment 3 is closed completely, a trunk lock mechanism 15 installed in the center of the lower end part of the rear face part 13 is engaged on the vehicle body side, and locked so as to maintain the totally closed state. By a predetermined lock release operation being performed from this state, the trunk lid 11 is turned as described previously, which enables the opening of the trunk compartment 3 to be opened.

Figure 2:
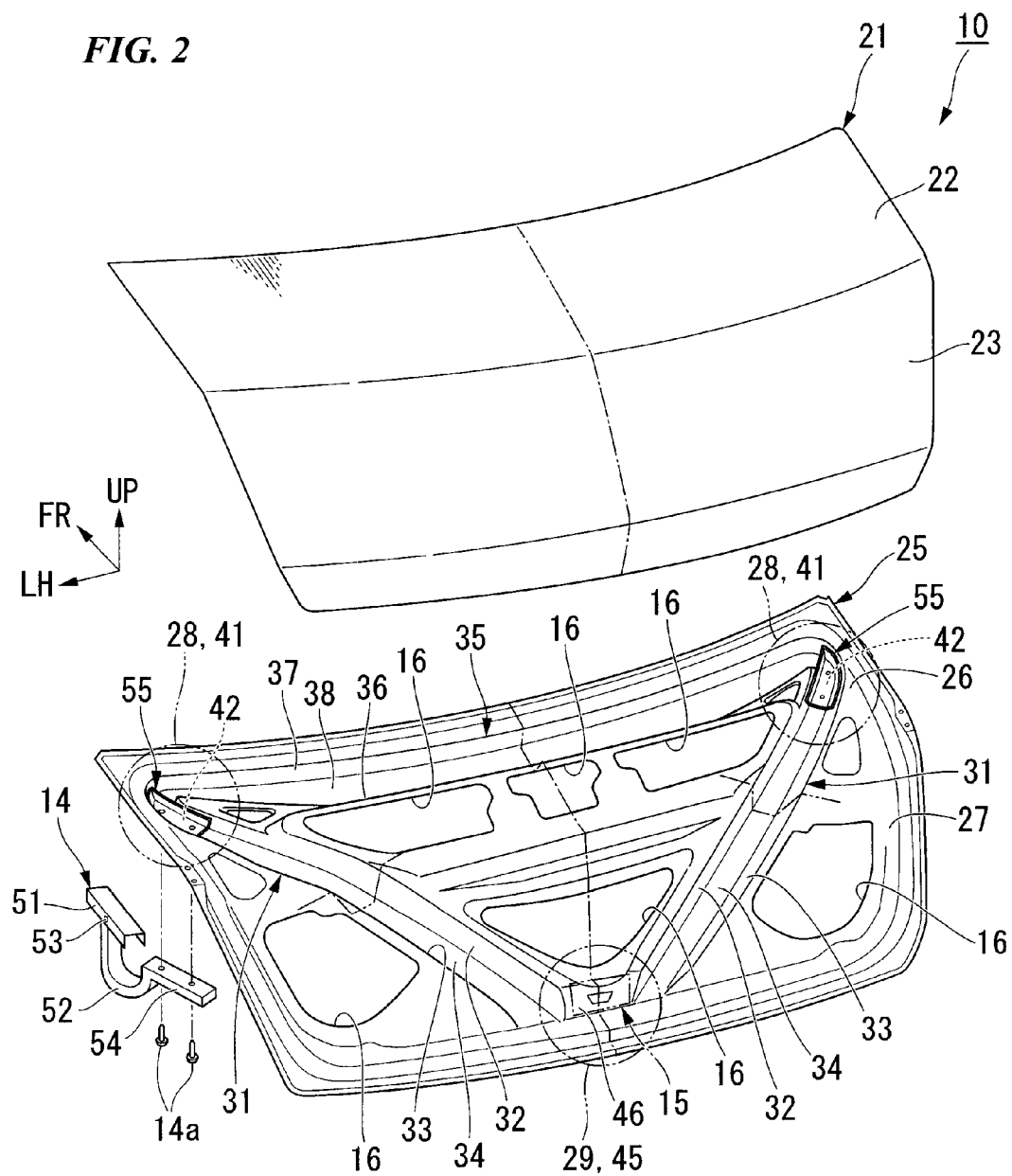
FIG. 2 is an exploded perspective view of a trunk lid of the vehicle.

As shown in FIG. 2, the trunk lid 11 is provided principally with an outer panel 21, which forms its outer surface (vehicle outer surface), and an inner panel 25, which reinforces the outer panel 21 from the inside (trunk compartment 3 side) of the vehicle. The inner panel 25 is installed such that it substantially coincides with the reverse face of the outer panel 21.

That is, the outer panel 21 and the inner panel 25 are formed such that the shape of the cross-section perpendicular to the width direction of the vehicle is approximately L-shaped, similarly to the overall shape of the trunk lid 11. Hereunder, the parts forming the top face part 12 of the outer panel 21 and the inner panel 25 are designated as an outer top face part 22 and an inner top face part 26, and the parts forming the rear face part 13 are designated as an outer rear face part 23 and an inner rear face part 27.

The outer panel 21 and the inner panel 25 are formed into an integrated trunk lid 11 by: aligning the two top face parts 22 and 26 and the two rear face parts 23 and 27 with each other; joining the outer peripheral edges (the front edges and the two side edges of the top face parts 22 and 26; and the two side edges and the bottom edges of the rear face parts 23 and 27) together using a hemming process; and also joining the inner peripheral edges appropriately using adhesive, welding, or the like.

Figure 3:
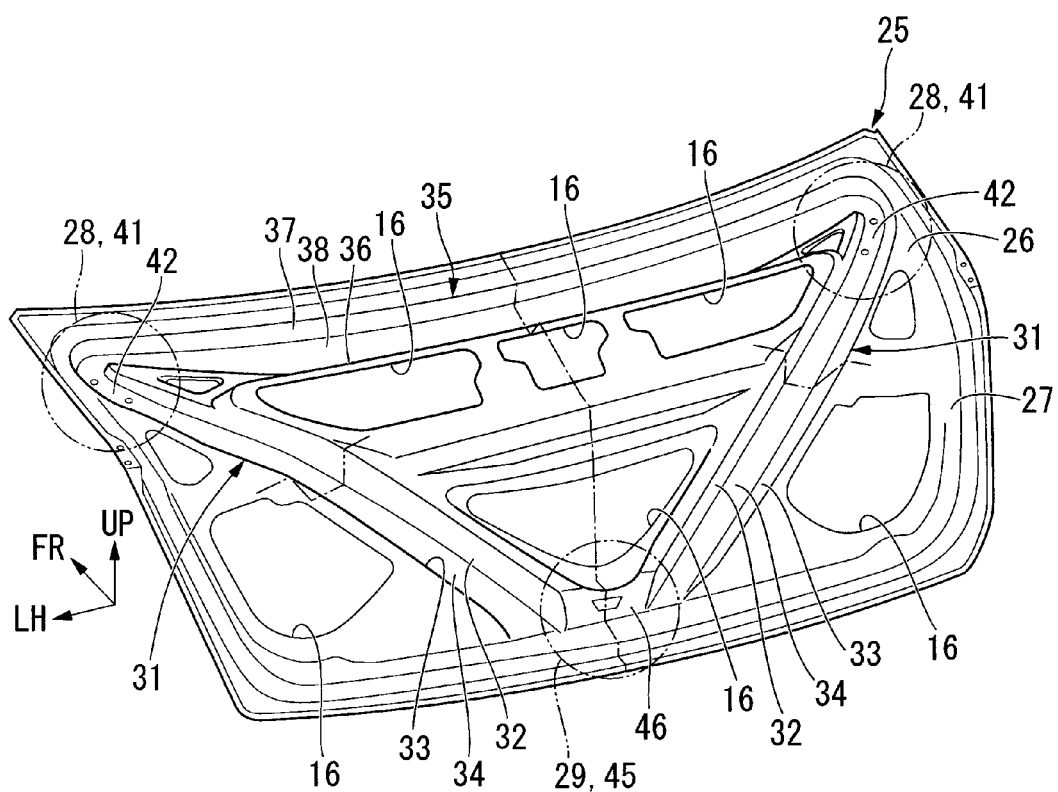
FIG. 3 is a perspective view of an inner panel of the trunk lid.

With reference also to FIG. 3, left and right hinge installation sections 28 are provided at the two sides of the front end part of the inner top face part 26 of the inner panel 25 for the installation of the left and right trunk hinges 14. Furthermore, a lock installation section 29 is provided in the center of the lower end of the inner rear face part 27 for the installation of the trunk lock mechanism 15.

The left and right trunk hinges 14 are installed on the left and right hinge installation sections 28 from the underside (outside of the trunk lid 11, trunk compartment 3 side) using bolts or the like, and the trunk lock mechanism 15 is installed from the rear side (inner side of the trunk lid 11) on the lock installation section 29 using bolts or the like (only the bolts for hinge installation are shown, by reference symbol 14a in FIG. 2). Working holes 16 (also lightening holes), which enable the parts other than the trunk lock mechanism 15 to be installed in the trunk lid 11, are formed as required in the inner panel 25.

Left and right beading parts 31, which extend between the left and right hinge installation sections 28 and the lock installation section 29, are formed in the inner panel 25. The left and right beading parts 31 span the inner top face part 26 and the inner rear face part 27, with their cross-sectional shape being approximately uniform, extending diagonally and in straight lines such that they are approximately V-shaped when viewed from above (or the rear) of the trunk lid 11.

The cross-section of the left and right beading parts 31 is a trapezoidal shape, which protrudes on the trunk compartment 3 side, and the lower base sides of the trapezoidal shape face the outer panel 21, as an open side. The edges of the two sides on the open side of the left and right beading parts 31 are joined to the outer panel 21 by adhesive or welding, and the left and right beading parts 31 and the outer panel 21 form a closed cross-section structure (frame structure). Hereunder, the wall parts on the inner side in the vehicle widthwise direction, the wall parts on the outer side in the vehicle widthwise direction, and the wall parts on the upper base side of the trapezoidal shape of the left and right beading parts 31 are designated inner wall parts 32, outer wall parts 33, and base wall parts 34, respectively.

The front end parts (top end parts) of the left and right beading parts 31 are located in the vicinities of the side edges of the inner panel 25, and they extend diagonally such that they are separated from the side edges of the inner panel 25 and located inside of the left and right towards the rear side (lower side). In this manner, avoiding forming the left and right beading parts 31 at the edges of the two sides of the inner panel 25, where it is difficult to ensure the depth of the beading, contributes to an improvement in the formability of the whole inner panel 25.

A hinge side beading part 35, which extends between the left and right hinge installation sections 28, is formed in the inner panel 25. The hinge side beading part 35 is a gentle convex arc shape toward its rear, and has an approximately uniform cross-sectional shape, extending along the front edge of the inner top face part 26.

The cross-section of the hinge side beading part 35 is a trapezoidal shape, which protrudes on the trunk compartment 3 side, and the lower base sides of the trapezoidal shape face the outer panel 21, as an open side. The edges of the two sides on the open side of the hinge side beading part 35 are joined to the outer panel 21 by adhesive or welding, so that the hinge side beading part 35 and the outer panel 21 form a closed cross-section structure (frame structure). Hereunder, the wall part on the rear side, the wall part on the front side, and the wall part on the upper base side of the trapezoidal shape of the hinge side beading part 35 are designated a rear wall part 36, a front wall part 37, and a base wall part 38, respectively.

The beading parts 31 and 35 are arranged in an inverted triangle shape when viewed from above (or the rear of) the trunk lid 11, linking the left and right hinge installation sections 28 and the lock installation section 29, with these as apexes. In this manner, by linking the left and right hinge installation sections 28 and the lock installation section 29, which are force input points to the trunk lid 11, in straight lines using a frame structure having the beading parts 31 and 35 as its principal members, the stiffness is enhanced efficiently. This is especially desirable in a trunk lid 11 that has a top face part 12 and a rear face part 13, and whose cross-section is approximately L-shaped, from the point of ensuring sufficient stiffness for the upward load from the trunk lock mechanism 15 when it is closed.

The left and right hinge installation sections 28 are also both joining sections 41 (left and right beading joining sections) of the front end parts (top end parts) of the left and right beading parts 31 and the left and right end parts of the hinge side beading part 35. The lock installation section 29 is also a joining section 45 (central beading joining section) of the lower end parts (rear end parts) of the left and right beading parts 31.

In the central beading joining section 45, the lower end parts of the left and right beading parts 31 are joined in a state in which they are separated from each other by a specified distance, with a lock installation bearing surface 46 on which the trunk lock mechanism 15 is installed, between them.

On the other hand, in the left and right beading joining parts 41, the front end parts of the left and right beading parts 31 and the left and right end parts of the hinge side beading part 35 are each bent at an acute angle such that they are folded toward each other to be joined. In this manner, by arranging the front end parts of the left and right beading parts 31 and the left and right end parts of the hinge side beading part 35 continuously, the stiffness of the left and right hinge installation sections 28 is enhanced efficiently.

As shown in FIG. 2, the left and right trunk hinges 14 have principally a base member 51, which is fastened to the vehicle body side by bolts or the like, and a hinge arm 52, which is fastened to the trunk lid 11 side by bolts 14*a* or the like. The front end parts of the hinge arms 52 are joined to the base member 51 rotatably via hinge shafts 53, which lie in the vehicle widthwise direction. The rear half sections of the left and right hinge arms 52 are fastening parts 54 for the left and right hinge installation sections 28 of the trunk lid 11 (inner panel 25). The front half sections of the hinge arms 52 are formed in a downward convex arc shape so as to avoid interference with the vehicle body when the trunk lid 11 is opened.

Figure 4A:
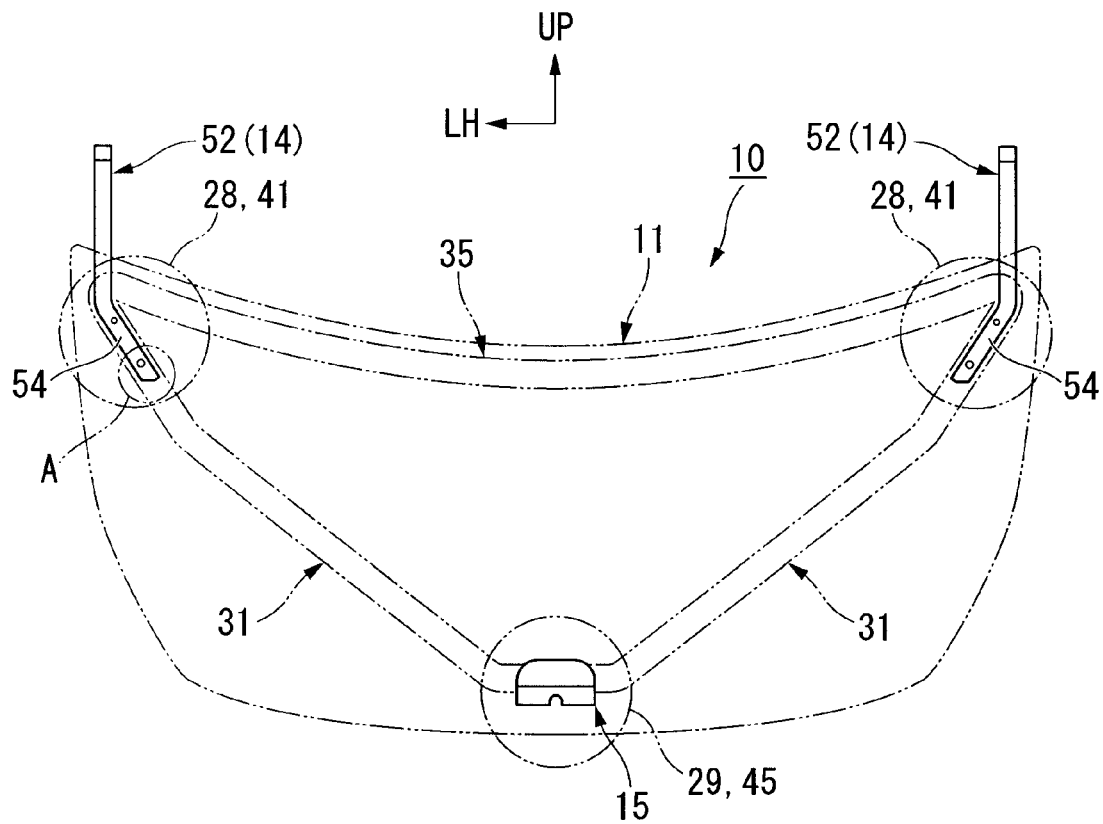
FIG. 4A is an explanatory view of the top face showing the main structure of the trunk lid.

With reference also to FIG. 4A, the front half portions of the left and right hinge arms 52 are arranged approximately parallel to the rearwards-forwards direction of the vehicle. Conversely, the rear half portions, in other words, the fastening parts 54, are arranged such that they are located toward the inside in the widthwise direction of the vehicle toward the rear end side. As a result, the fastening parts 54 of the left and right hinge arms 52 are approximately parallel to the lengthwise direction of the left and right beading parts 31, so that the left and right fastening parts 54 and the left and right beading parts are joined in a straight line. In this state, the left and right fastening parts 54 are fastened to the hinge installation bearing surfaces 42 provided in the front end parts of the left and right beading parts 31 by the bolts 14*a* or the like.

As a result, the left and right beading parts 31 are joined to the fastening parts 54 of the hinge arms 52 in straight lines so that flexing of the left and right hinge installation sections 28 is suppressed, which enhances the stiffness of the trunk lid 11 efficiently. Furthermore, it is not necessary to form other hinge installation bearing surfaces 42 in the vicinities of the front end parts of the left and right beading parts 31, or to bend the front end parts of the left and right beading parts 31 along the side edges of the inner panel 25, which improves the formability (amount of freedom in forming) of the inner panel 25, and therefore contributes to the improvement of the stiffness of the inner panel 25 that resulted from ensuring the depth of the beading.

Figure 5:
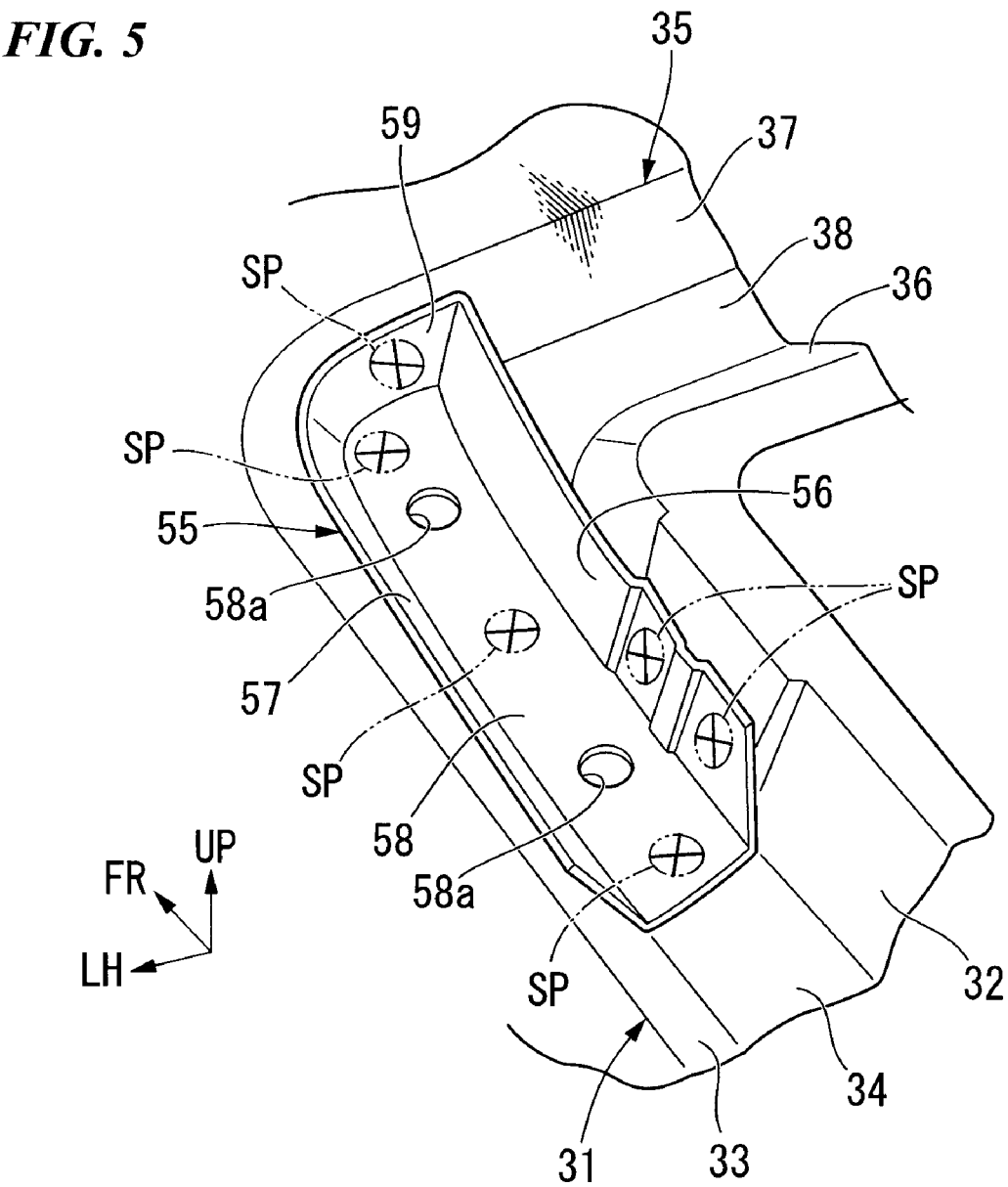
FIG. 5 is a perspective view of a hinge installation section of the above-described inner panel.

As shown in FIG. 5, left and right stiffening members 55 are provided inside the front end parts of the left and right beading parts 31, respectively, to reinforce the peripheries of the hinge installation bearing surfaces 42. The cross-sections of the left and right stiffening members 55 are a trapezoidal shape, so that they coincide with the inner surfaces of the front end parts of the left and right beading parts 31, and extend diagonally in the lengthwise directions of the left and right beading parts 31. Hereunder, the wall parts on the inner side in the vehicle widthwise direction of the left and right stiffening members 55 are designated inner wall parts 56, the wall parts on the outer side in the vehicle widthwise direction are designated outer wall parts 57, and the wall parts on the upper base side of the trapezoidal shape are designated base wall parts 58.

The inner wall parts 56, the outer wall parts 57 and the base wall parts 58 of the left and right stiffening members 55 are joined to the inner wall parts 32, the outer wall parts 33, and the base wall parts 34 of the left and right beading parts 31, respectively, by spot-welding (only the spot points that can be illustrated, are indicated as reference symbols SP in the drawing).

The inner wall parts 56 and the outer wall parts 57 of the left and right stiffening members 55 extend to the front end parts of the left and right beading parts 31 (which are also the front wall parts 37 of the left and right end parts of the hinge side beading part 35). At this point, the inner wall parts 56 of the left and right stiffening members 55 span the left and right end parts of the hinge side beading part 35.

The left and right stiffening members 55 have front end wall parts 59 that span between the front ends of the inner wall parts 56 and the outer wall parts 57, and the front end wall parts 59 butt up against the front end parts of the left and right beading parts 31 (front wall parts 37 of the left and right end of the hinge side beading part 35), and are joined to them by spot welding. The base wall parts 58 of the left and right stiffening members 55 are spot welded to the inner panel 25 at three places, namely; to the front of a pair of bolt holes 58*a* which are formed in the base wall part 58 such that they are in line front to rear, between the two bolt holes 58*a*, and rearward of the bolt holes 58*a*.

Two points front and rear in the rear half of the inner wall part 56 of the left and right stiffening members 55 are spot welded to the inner panel 25. Moreover, a plurality of points front to rear of the outer wall parts 57 of the left and right stiffening members 55 are spot welded to the inner panel 25, which limits the stress concentration on the spot points when load is applied around the left and right hinge installation sections 28.

Figure 4B:
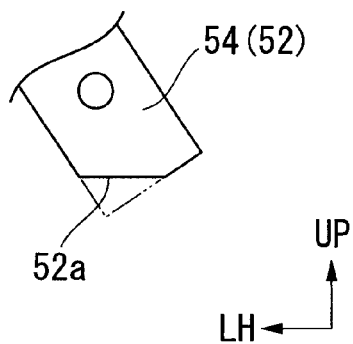
FIG. 4B is an enlarged view of part A of FIG. 4A.

As shown in FIG. 4B, the rear ends of the hinge arms 52 of the left and right trunk hinges 14 are not simply cut perpendicularly in the lengthwise direction, but have inclined cut parts 52*a* cut approximately parallel to the vehicle widthwise direction. By so doing, even when various forces are applied to the trunk lid 11 supported by the left and right trunk hinges 14, stress concentration at the contact points of the front end corner parts of the left and right hinge arms 52 in the left and right hinge installation bearing surfaces 42 is limited. As a result, the stiffness of the left and right hinge installation sections 28 can be enhanced efficiently.

As described above, in the trunk lid frame structure according to the present embodiment, the trunk lid 11 has the outer panel 21 on the outside of the vehicle and the inner panel 25 on the inside of the vehicle, and is formed such that its cross-section is approximately L-shaped with the top face part 12 and the rear face part 13, wherein: the left and right hinge installation sections 28 to which the hinge arms 52 of the left and right trunk hinges 14 are attached are provided on the left and right sides of the top face part 12; the lock installation section 29 to which the trunk lock mechanism 15 is attached is provided in the left to right center of the rear face part 13; the left and right beading parts 31 which are in an approximately V-shaped arrangement such that they extend between the left and right hinge installation sections 28 and the lock installation section 29, are provided on the inner panel 25; and the fastening parts 54 of the left and right hinge arms 52 are arranged diagonally along the lengthwise direction of the left and right beading parts 31.

According to this construction, since the fastening parts 54 of the left and right hinge arms 52 are arranged diagonally along the lengthwise direction of the left and right beading parts 31, the left and right beading parts 31 are linked in straight lines to the fastening parts 54 of the hinge arms 52, so that flexing of the left and right hinge installation sections 28 is suppressed efficiently, which enables the stiffness of the whole trunk lid 11 to be improved.

Furthermore, it is possible to provide the hinge installation bearing surfaces 42 of the left and right hinge installation sections 28 directly on the left and right beading parts 31, so that compared with the case in which the hinge installation bearing surfaces 42 are formed separately in the vicinities of the left and right beading parts 31, it is possible to improve the formability of the inner panel 25 and improve the stiffness as a result of increasing the beading depth and the like, and also improve the workability and lightening as a result of enlarging the working holes 16 (lightening holes).

Moreover, in the above-described trunk lid frame structure, since the hinge side beading part 35 that extends between the left and right hinge installation sections 28 is provided in the inner panel 25, and the hinge side beading part 35 and the left and right beading parts 31 are arranged continuously, the left and right hinge installation sections 28 and the lock installation section 29, which are force input points to the trunk lid 11, are linked via the beading parts 31 and 35, and thus it is possible to increase the stiffness of the whole inner panel 25 efficiently.

Furthermore, in the trunk lid frame structure, since left and right stiffening members 55 are provided in the left and right hinge installation sections respectively, and the left and right stiffening members 55 have inner wall parts 56 that extend diagonally along the lengthwise direction of the left and right beading parts 31 and span the hinge side beading part 35, it is possible to increase the stiffness with respect to the load at the joining sections 41 of the left and right beading parts 31 and the hinge side beading part 35 when opening and closing the trunk lid 11.

Moreover, in the trunk lid frame structure, since the ends of the fastening parts 54 of the hinge arms 52 are cut along the widthwise direction of the vehicle, it is possible to effectively prevent the occurrence of stress concentration originating from the corners at the ends of the fastening parts 54 of the hinge arms 52.

The present invention is not limited only to the above-described embodiment. For example, the construction may be such that the trunk lock mechanism 15 is installed on the vehicle side, and a striker corresponding to the trunk lock mechanism 15 is installed in the trunk lid 11. Furthermore, the construction may be such that the left and right stiffening members 55 span the left and right beading parts 31 and the hinge side beading part 35, and bend around with them.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A frame structure of a trunk lid installed in a vehicle, wherein:
   the trunk lid has an outer panel on an outside of the vehicle and an inner panel on an inside of the vehicle, and is formed such that its cross-section is approximately L-shaped, with a top face part and a rear face part;
   left and right hinge installation sections to which hinge arms of left and right trunk hinges are attached are provided respectively on the left and right sides of the top face part, and a lock installation section to which a trunk lock mechanism is attached is provided in the left to right center of the rear face part;
   left and right beading parts, which are in an approximately V-shaped arrangement such that they extend between the left and right hinge installation sections and the lock installation section, are provided on the inner panel; and
   fastening parts of hinge arms, which are fastened to the left and right hinge installation sections, are arranged along the lengthwise direction of the left and right beading parts so as to extend diagonally along the inner panel toward the lock installation section.

2. The frame structure of a trunk lid according to claim 1, wherein:
   a hinge side beading part that extends between the left and right hinge installation sections is provided on the inner panel; and
   the hinge side beading part and the left and right beading parts are arranged continuously.

3. The frame structure of a trunk lid according to claim 2, wherein:
   left and right stiffening members are provided in the left and right hinge installation sections respectively; and
   the left and right stiffening members are provided spanning the left and right beading parts and the hinge side beading part.

4. The frame structure of a trunk lid according to claim 3, wherein
   the left and right stiffening members extend along the lengthwise direction of the left and right beading parts so as to extend diagonally along the inner panel, and also have wall parts that span the hinge side beading part.

5. The frame structure of a trunk lid according to claim 3, wherein ends of fastening parts of the hinge arms are cut along a widthwise direction of the vehicle.

* * * * *